(12) United States Patent
Teshima et al.

(10) Patent No.: US 7,557,150 B2
(45) Date of Patent: Jul. 7, 2009

(54) METHOD FOR MANUFACTURING DISPERSION AND INK USING DISPERSION OBTAINED THEREBY

(75) Inventors: Takayuki Teshima, Yokohama (JP); Kazumichi Nakahama, Tokyo (JP); Yukio Hanyu, Isehara (JP); Mamoru Sakashita, Tsukui-gun (JP); Akira Kuriyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 11/610,754

(22) Filed: Dec. 14, 2006

(65) Prior Publication Data
US 2007/0149651 A1 Jun. 28, 2007

(30) Foreign Application Priority Data
Dec. 22, 2005 (JP) ............................. 2005-370097

(51) Int. Cl.
*B01F 5/06* (2006.01)
*C09B 48/00* (2006.01)
(52) U.S. Cl. ...................................... 523/315; 106/495
(58) Field of Classification Search ................. 523/315; 106/495
See application file for complete search history.

(56) References Cited

U.S. PATENT DOCUMENTS

| 6,537,364 B2 * | 3/2003 | Dietz et al. ................. 106/493 |
| 2004/0009294 A1 | 1/2004 | Kuribayashi et al. ........ 427/212 |

FOREIGN PATENT DOCUMENTS

| EP | 0 861 880 A1 | 9/1998 |
| JP | 58-183756 | 10/1983 |
| JP | 10-88042 | 4/1998 |
| JP | 2002-155221 | 5/2002 |
| JP | 2004-43776 | 2/2004 |
| JP | 2004-68072 | 3/2004 |
| JP | 2004-068072 | 3/2004 |

* cited by examiner

*Primary Examiner*—Mark Eashoo
*Assistant Examiner*—Jae Kwak
(74) *Attorney, Agent, or Firm*—Fitzpatrick, Cella, Harper & Scinto

(57) ABSTRACT

A method for manufacturing a dispersion, the method including a step of forming a reaction product by allowing at least two types of liquids to react with each other, the dispersion including a dispersion medium and particles formed from the reaction product dispersed therein. In the method described above, the at least two types of liquids are ejected from independently provided respective nozzles so that traveling directions of the liquids ejected therefrom intersect with each other at an angle of 120° or less and so that the liquids then flow in an integrated manner, whereby the reaction product is generated.

5 Claims, 11 Drawing Sheets

METHOD FOR MANUFACTURING DISPERSION AND INK USING DISPERSION OBTAINED THEREBY

BACKGROUND OF THE INVENTION

1. Field of the Invention

The present invention relates to a method for manufacturing a dispersion and to an ink using a dispersion obtained by the above method.

2. Description of the Related Art

In aqueous dispersion materials containing functional materials, as the functional materials, for example, there have been known agricultural chemicals, such as herbicides and insecticides; medicines, such as anticancer agents, antiallergic agents, and antiphlogistic agents; and color materials, such as inks and toners, which contain colorants. As the colorants contained in inks or toners, pigments have started to be used. Concomitant with the trend toward the use of pigments, in order to obtain superior pigment dispersions containing pigments, a method for dispersing pigment using a microjet reactor has been proposed. For example, in Japanese Patent Laid-Open No. 2002-155221, a method for obtaining a pigment suspension has been disclosed in which a precipitation medium and a solution containing a crude pigment are sprayed from respective nozzles to collide with each other in a housing of a reactor chamber.

In Japanese Patent Laid-Open No. 2002-155221, since the solution containing pigment and the precipitation medium are sprayed from the respective nozzles facing each other for mixing, a liquid is scattered in the housing in the reactor chamber. In this case, it is believed that after the scattered liquid and/or reaction product adhere to and precipitate on the inside wall of the housing, they are separated and peeled away from the wall with time. Accordingly, the separated and peeled liquid and/or reaction product may perform secondary reaction with liquids which are newly sprayed from the nozzles in some cases. Hence, by the method disclosed in Japanese Patent Laid-Open No. 2002-155221, it is not always easy to stably obtain a uniform dispersion for a long period of time.

SUMMARY OF THE INVENTION

The present invention has been conceived in consideration of the background art described above and provides a method for manufacturing a dispersion, which can manufacture a dispersion stably for a long period of time by suppressing scattering of liquids which are to be mixed with each other. In addition, the present invention also provides a pigment ink which is formed using a dispersion obtained by the manufacturing method described above, the pigment ink having superior dispersibility of pigment particles and being capable of forming a printed image which has superior glossiness.

A method for manufacturing a dispersion, according to a first aspect of the present invention, comprises a step of forming a reaction product by allowing at least two types of liquids to react with each other, the dispersion including a dispersion medium and particles dispersed therein, which are formed from the reaction product. In the manufacturing method described above, said at least two types of liquids are ejected from independently provided respective nozzles so that traveling directions of the liquids intersect with each other at an angle of 120° or less and so that the liquids then flow in an integrated manner, thereby forming the reaction product.

A dispersion according to a second aspect of the present invention comprises a dispersion medium and particles of a reaction product dispersed therein, which is formed by reaction between at least two types of liquids. In the dispersion described above, said at least two types of liquids are ejected from independently provided respective nozzles so that traveling directions of the liquids intersect with each other at an angle of 120° or less and so that the liquids then flow in an integrated manner, thereby forming the reaction product.

Further features of the present invention will become apparent from the following description of exemplary embodiments with reference to the attached drawings.

DESCRIPTION OF THE EMBODIMENTS

The method for manufacturing a dispersion, according to the first aspect of the present invention, is a method which comprises a step of forming a reaction product by allowing at least two types of liquids to react with each other, the dispersion including a dispersion medium and particles formed from the reaction product dispersed therein. In the method described above, said at least two types of liquids are ejected from independently provided respective nozzles so that traveling directions of the liquids intersect with each other at an angle of 120° or less and so that the liquids then flow together in an integrated manner, thereby forming the reaction product.

In the present invention, when a nozzle opening area and a flow rate of an ejected liquid are represented by S (mm$^2$) and L (ml/min), respectively, the flow rate of the ejected liquid can be set so that L/S is in the range of 26 to 360.

The reaction of the present invention includes a reprecipitation reaction. In this case, one of said at least two types of liquid may be a solution dissolving a pigment and a dispersing agent, and another liquid may be a solvent which decreases the solubility of the dissolved pigment.

The reaction of the present invention includes a coupling reaction. In this case, one of said at least two types of liquids is a solution dissolving a coupler and a dispersing agent, and another liquid contains a diazinium salt.

The reaction of the present invention includes a hydrolysis-polycondensation reaction. In this case, one of said at least two types of liquids is a solution containing an inorganic alkoxide compound, and another liquid is an aqueous solvent.

According to the method of the present invention, since the liquids are prevented from being scattered, a secondary reaction can be avoided which is caused by the liquid scattering, and hence a dispersion can be manufactured stably for a long period of time.

The present invention includes a dispersion. The dispersion of the present invention comprises a dispersion medium and particles of a reaction product dispersed therein, the reaction product being formed by reaction between at least two types of liquids. According to the dispersion of the present invention, said at least two types of liquids are ejected from independently provided respective nozzles so that traveling directions of the liquids intersect with each other at an angle of 120° or less and so that the liquids then flow together in an integrated manner, thereby forming the reaction product.

One of said at least two types of liquids is a solution dissolving a pigment and a dispersing agent, and another liquid is a solvent decreasing the solubility of the dissolved pigment.

The dispersion of the present invention may be used as a pigment for ink-jet recording.

Hereinafter, with reference to the accompanying drawings, the dispersion manufacturing method according to the first aspect of the present invention will be described in detail.

Figure 1:
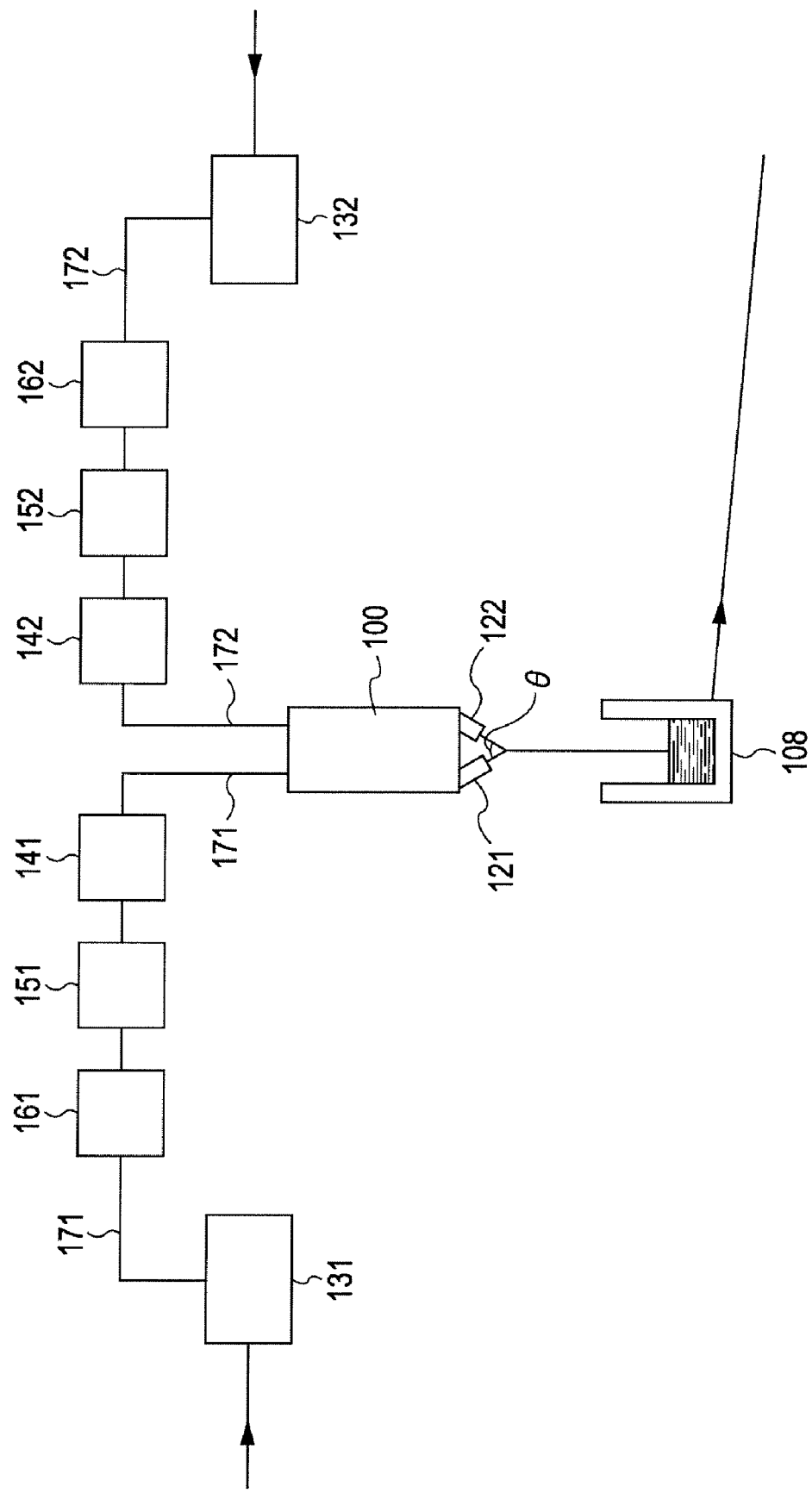
FIG. 1 is a schematic view showing an entire liquid mixing device system using a liquid mixing device which can be applied to a method for manufacturing a dispersion, according to the present invention.

FIG. 1 is a schematic view showing an entire liquid mixing device system which can be applied to the dispersion manufacturing method of the present invention. In FIG. 1, reference numeral 100 indicates a mixing device provided with nozzles 121 and 122, and liquids ejected from the nozzles 121 and 122 are brought into contact with each other for mixing and are then recovered by a liquid mixture recovery unit 108. In FIG. 1, reference numerals 131 and 132 indicate liquid supply units, and liquids are supplied to the liquid supply units 131 and 132 from liquid storage tanks (not shown). As the liquid supply units 131 and 132, for example, commercially available syringe pumps, plunger pumps, diaphragm pumps, and electromagnetic pumps may be used. Between the mixing device 100 and the liquid supply unit 131, a monitor unit 141, a control unit 151, and a temperature control unit 161 are connected to each other with a pipe 171 interposed therebetween. In the same manner as described above, between the mixing device 100 and the liquid supply unit 132, a monitor unit 142, a control unit 152, and a temperature control unit 162 are connected to each other with a pipe 172 interposed therebetween. The monitor units 141 and 142 are each composed of a flowmeter, a pressure gauge, and the like, and the control units 151 and 152 are each composed of valves and the like. The temperature control units 161 and 162 are each composed of a heater, a cooler, and the like. Those components are connected to each other with the pipes 171 and 172 which are each formed, for example, of a tube which can withstand liquids to be supplied. The individual components disposed between the liquid mixing device 100 and the liquid supply units 131 and 132 are provided whenever necessary, and all the components may not be always provided. The supply of the liquids ejected from the nozzles 121 and 122 to the liquid mixture recovery unit 108 may be performed using their own weights or may be performed using pressures generated by pumps.

Next, an embodiment of a liquid mixing device, which can be used to realize the manufacturing method of the present invention, will be described with reference to FIGS. 2 to 8. The liquid mixing device is a small chemical device to perform mixing and/or reaction in a liquid phase.

A liquid mixing device usable in this embodiment has the structure in which liquids are ejected from independently provided respective nozzles and are then brought into contact with each other in a region formed on extensions from the nozzles so as to start the mixing of the liquids. The nozzles are disposed so that the traveling directions of the liquids ejected therefrom are brought into contact with each other at an angle (θ) of 120° or less. When the angle is more than 120°, scattering of the liquids to be mixed together may probably occur.

Figure 2:
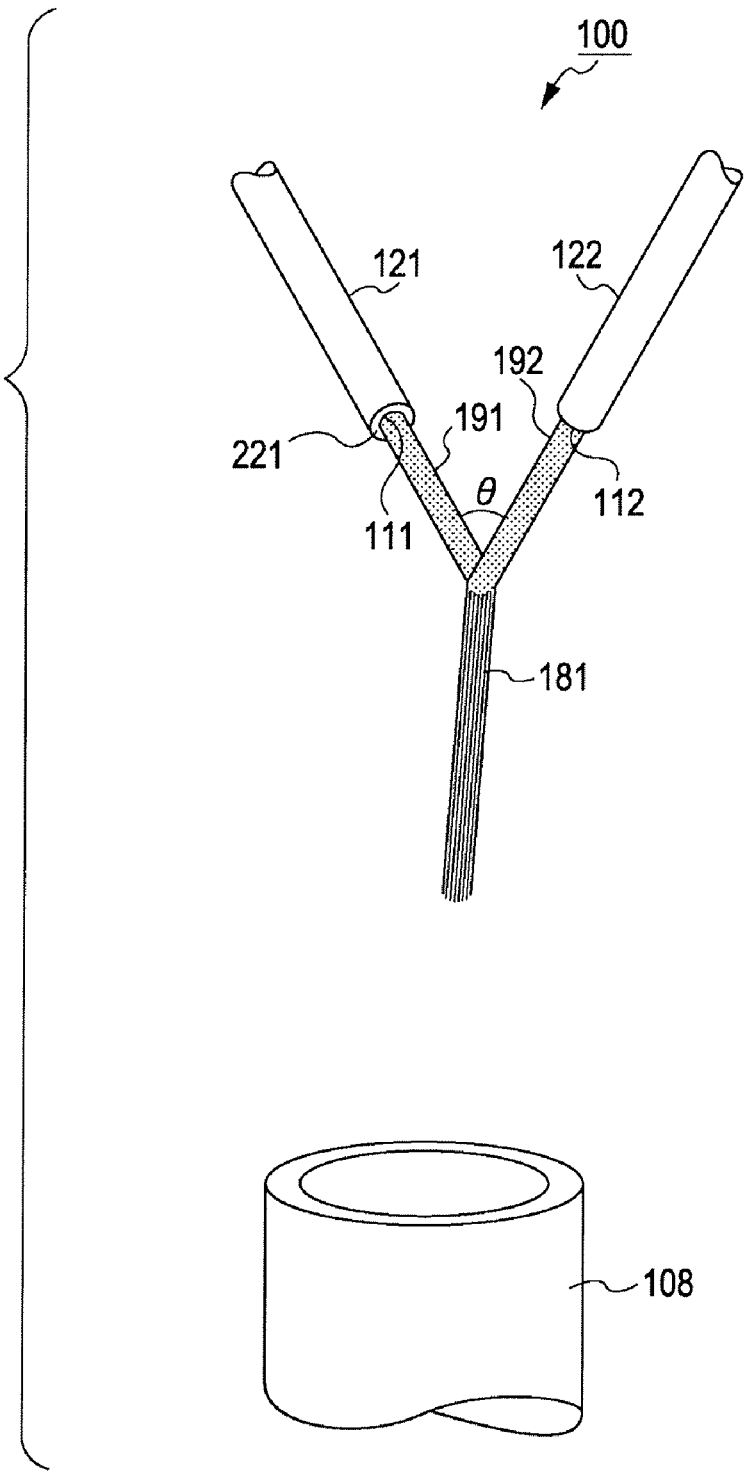
FIG. 2 is a schematic view showing a part of a mixing device which can be applied to a method for manufacturing a dispersion, according to the present invention.
Figure 3:
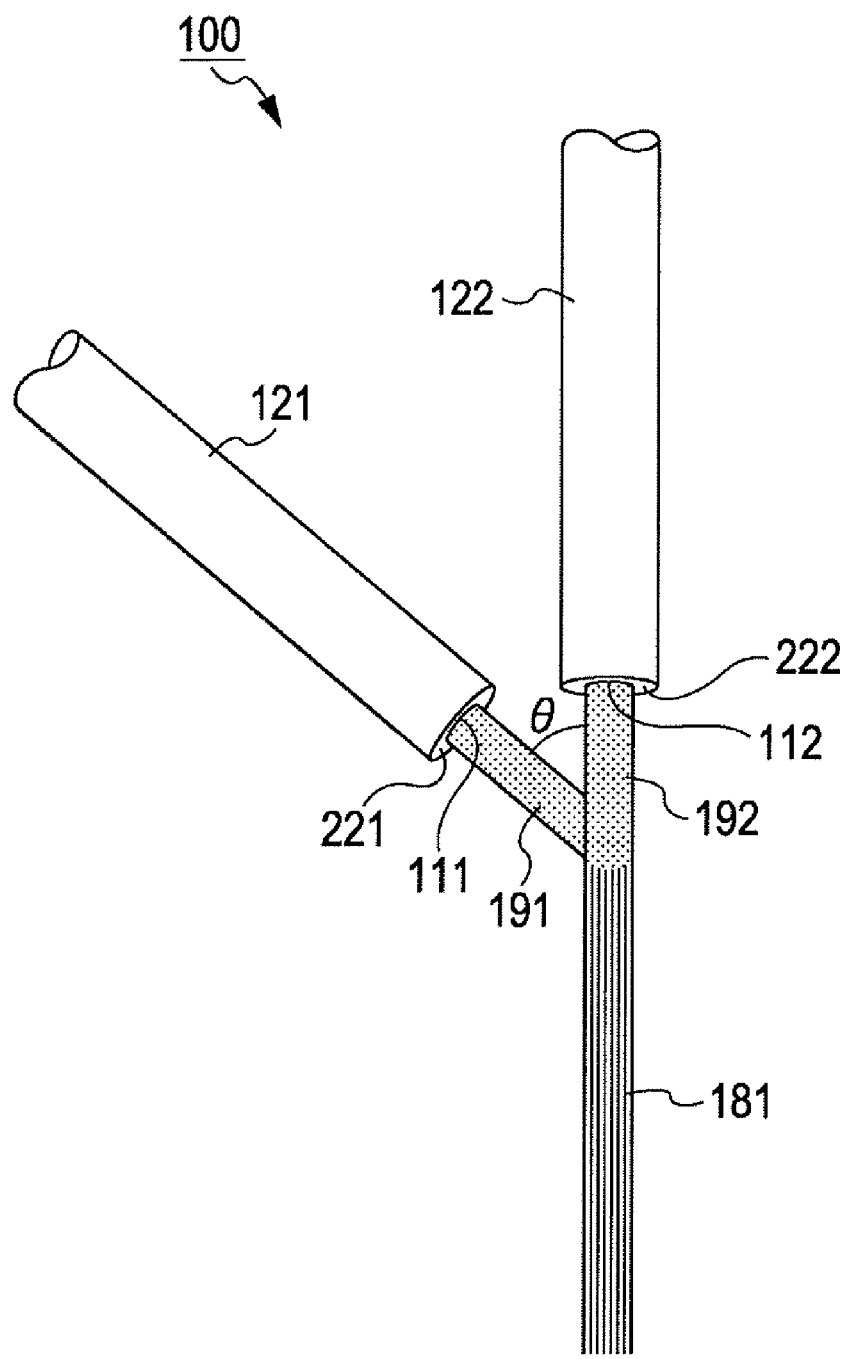
FIG. 3 is a schematic view showing a part of a mixing device which can be applied to a method for manufacturing a dispersion, according to the present invention.
Figure 4:
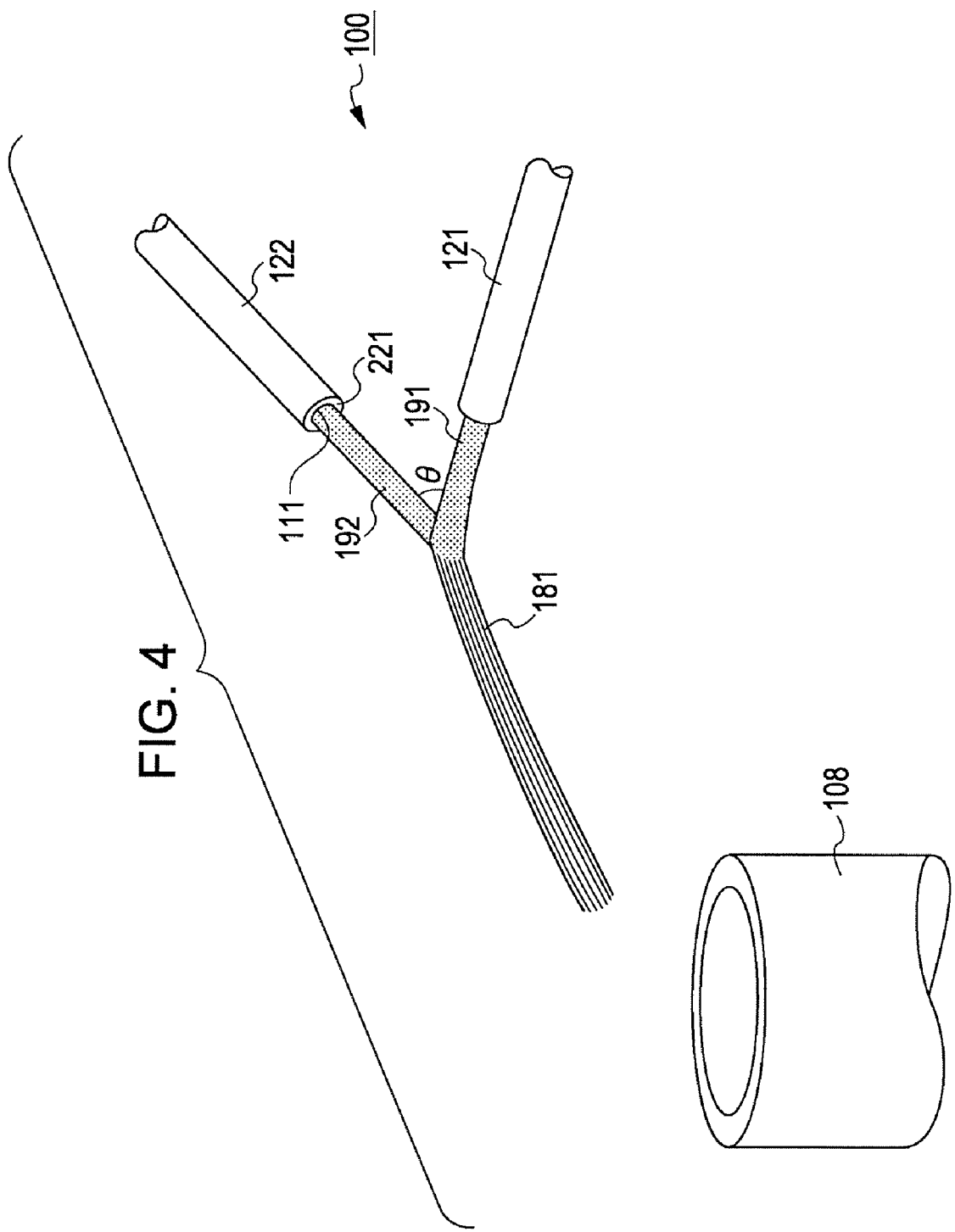
FIG. 4 is a schematic view showing a part of a mixing device which can be applied to a method for manufacturing a dispersion, according to the present invention.

At least two nozzles may be provided. FIGS. 2 to 4 show examples in which two nozzles are provided. In the liquid mixing device 100 shown in FIG. 2, through an opening 111 of the nozzle 121 and an opening 112 of the nozzle 122, liquids 191 and 192 are ejected, respectively. In this case, the nozzles 121 and 122 are disposed so that the traveling directions of the liquids 191 and 192 intersect with each other at an angle θ of 120° or less. In FIG. 2, reference numeral 221 indicates an opening surface in which the opening of the nozzle is formed, reference numeral 181 indicates a liquid mixture, and reference numeral 108 indicates the liquid mixture recovery unit. The liquid mixture 181 travels in an integrated manner in the direction towards the liquid mixture recovery unit. In the example shown in FIG. 3, the nozzle 122 is placed not to be inclined as compared to that shown in FIG. 2. Also in this case, the liquid mixture 181 is designed so as to travel in an integrated manner. In addition, in the example shown in FIG. 4, the ejection directions of the liquids are set to be approximately perpendicular to the gravity direction in a manner different from that shown in FIGS. 2 and 3. In the liquid mixing device using two nozzles, the arrangement of the nozzles is not limited to that shown in these examples; however, the nozzles may be arranged so that the traveling directions of the ejected liquids intersect with each other at an angle of 120° or less and so that the liquid mixture flows in an integrated manner in consideration of the viscosities, the flow velocities, and the like of the liquids.

Figure 5:
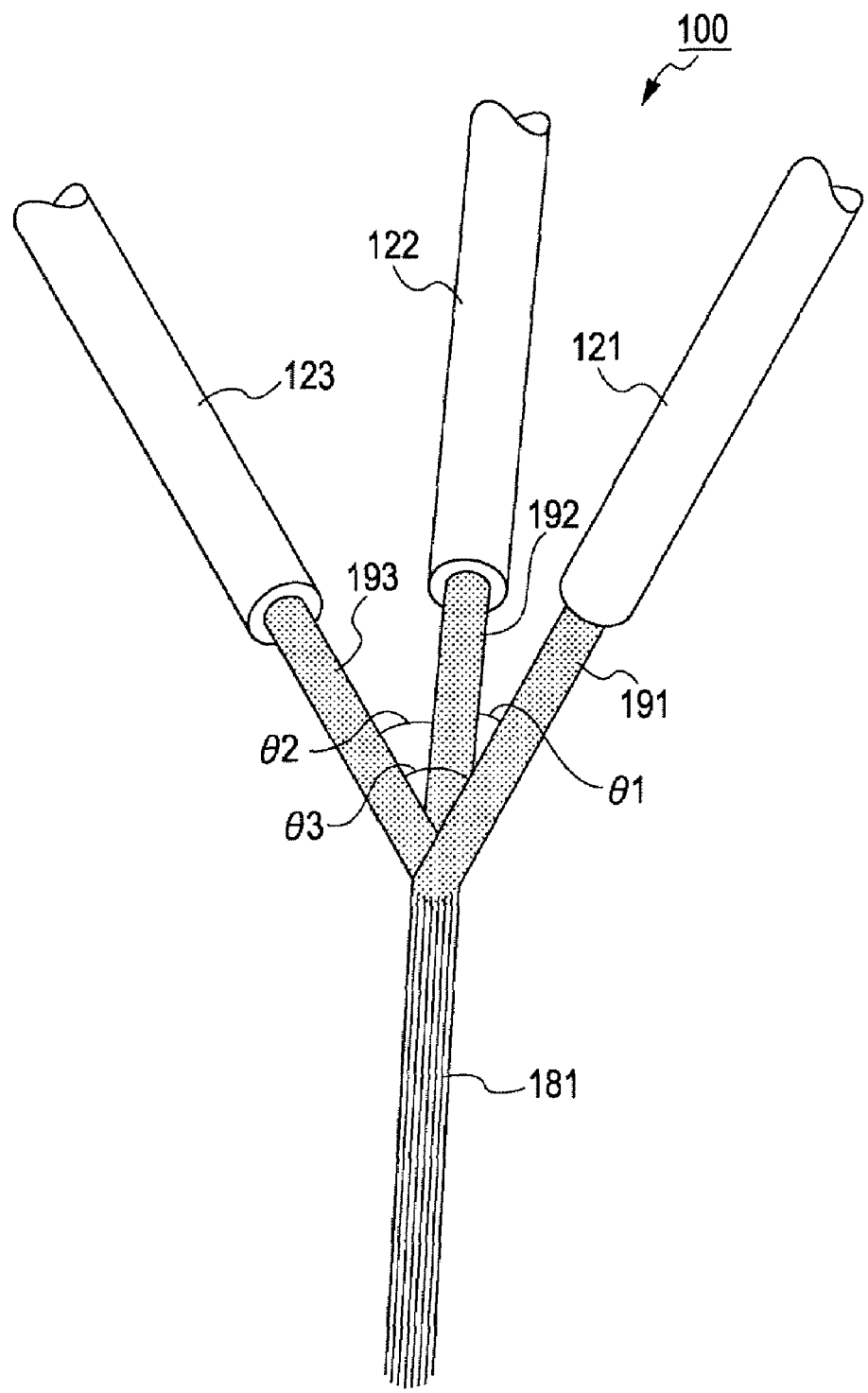
FIG. 5 is a schematic view showing a part of a mixing device which can be applied to a method for manufacturing a dispersion, according to the present invention.

FIG. 5 shows a device having three nozzles by way of example. Besides the nozzles 121 and 122, a nozzle 123 is provided, and a liquid 193 is ejected from the nozzle 123.

As described above, the nozzles are arranged so that the liquid mixture 181, which just starts mixing in the region on the extensions of the nozzles, flows in one direction in an integrated manner. Hence, in order to make the liquid mixture 181 flow in one direction, a carrier fluid is not required. In addition, since the liquid mixture, which just starts mixing, is not scattered in various directions and flows in an integrated manner, reaction products can be easily recovered without any loss thereof. When the angle formed by the extensions of the nozzles is larger than 120°, the liquid mixture, which just starts mixing, is liable to be scattered in various directions, and as a result, the traveling of the liquid mixture must be corrected in one direction by providing a new housing or a carrier fluid. In the present invention, since the liquid mixture is made to flow in an integrated manner, the mixing portion is not required to be surrounded by a housing.

In the present invention, in consideration of mass production, a mixing device may be used which is designed to satisfy a required production amount.

Figure 6:
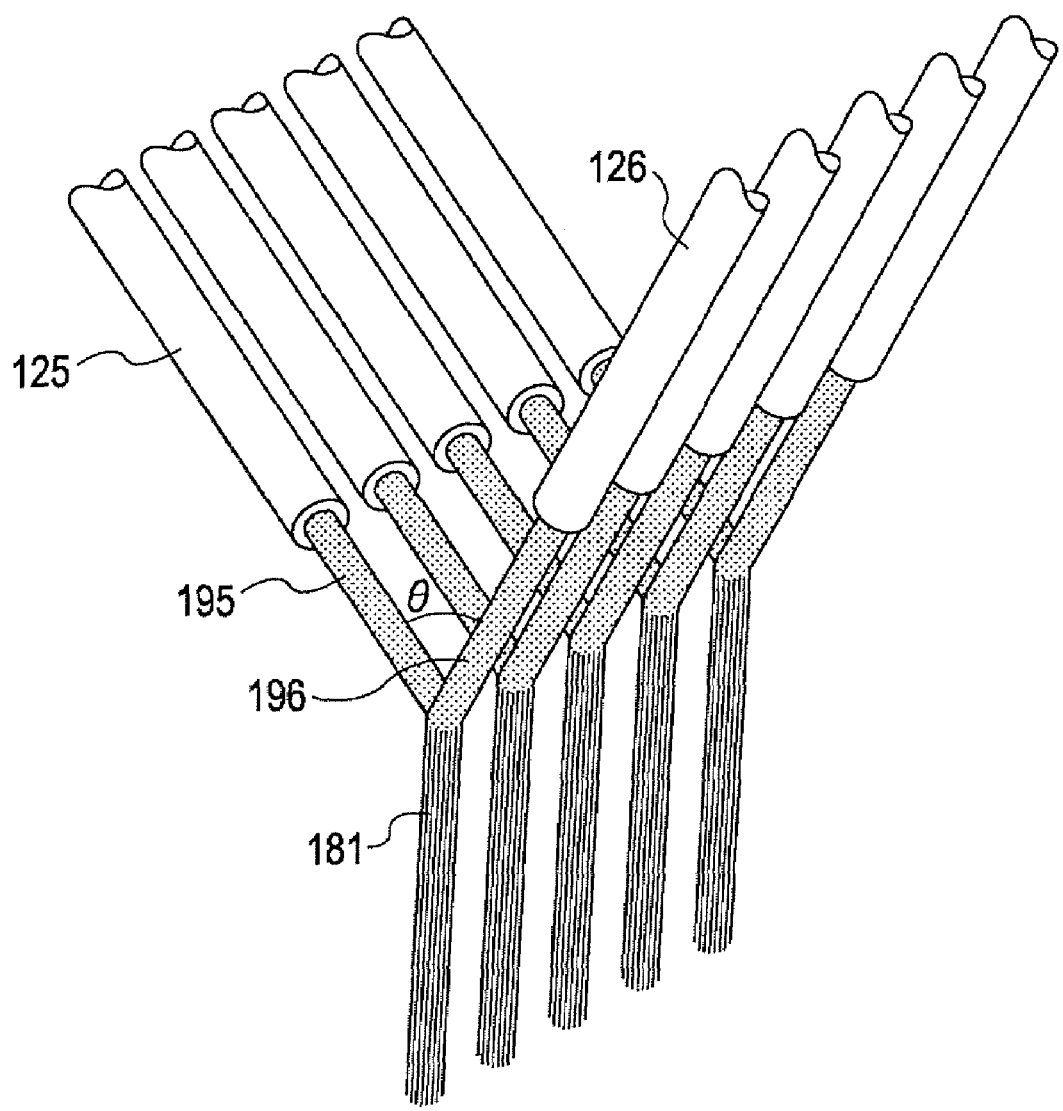
FIG. 6 is a schematic view showing a part of a mixing device which can be applied to a method for manufacturing a dispersion, according to the present invention.
Figure 7:
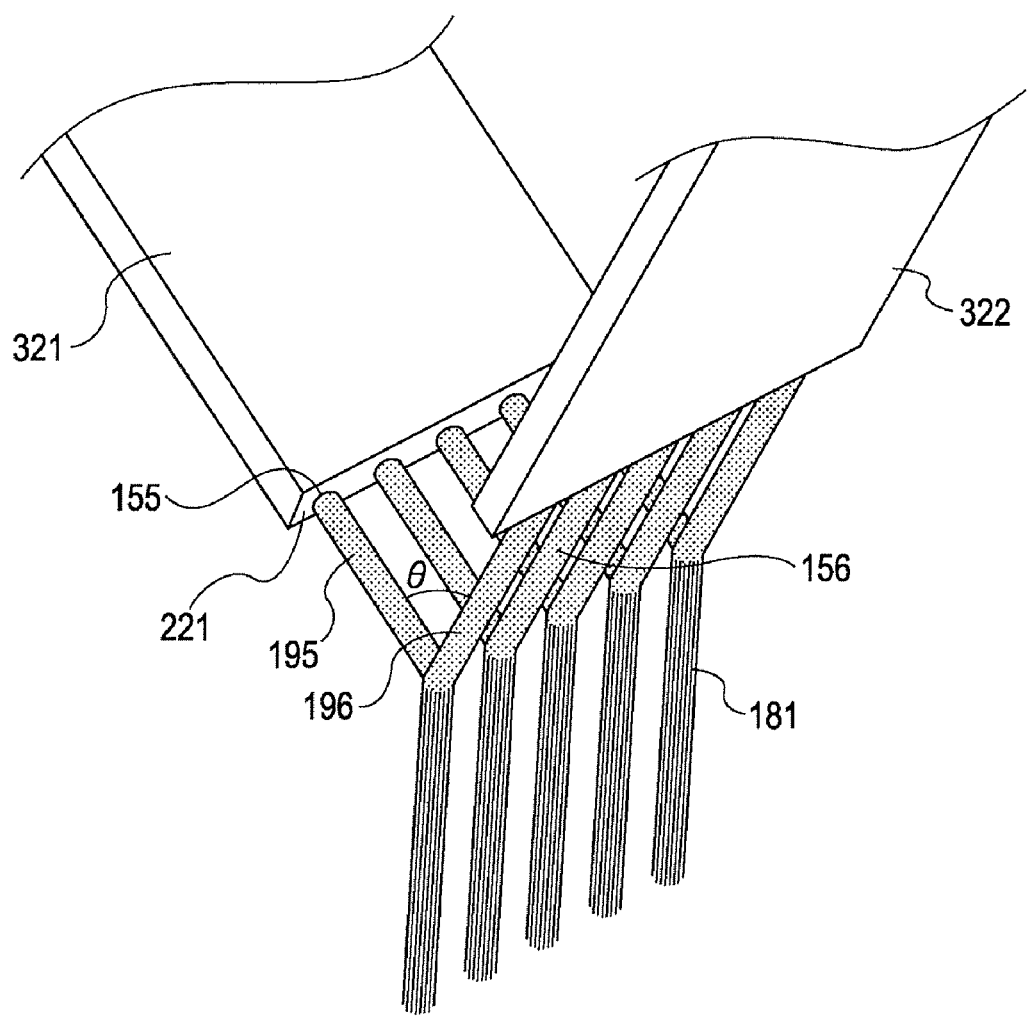
FIG. 7 is a schematic view showing a part of a mixing device which can be applied to a method for manufacturing a dispersion, according to the present invention.

Mixing devices shown in FIGS. 6 and 7 are devices in which the amounts of liquids processed therein are increased by disposing nozzles in parallel. In FIG. 6, a nozzle array 125 and a nozzle array 126 are disposed to correspond to each other, and a liquid 195 is ejected from the nozzle array 125 to form a stripe pattern and a liquid 196 is ejected from the nozzle array 126 to form a stripe pattern. In a device shown in FIG. 7, openings 155 are aligned in an opening surface 221 of a nozzle member 321, and in a nozzle member 322, openings 156 are also aligned as the case described above. From the openings 155 and 156 thus aligned, the liquids 195 and 196 are ejected, respectively, to form stripe patterns.

Figure 8:
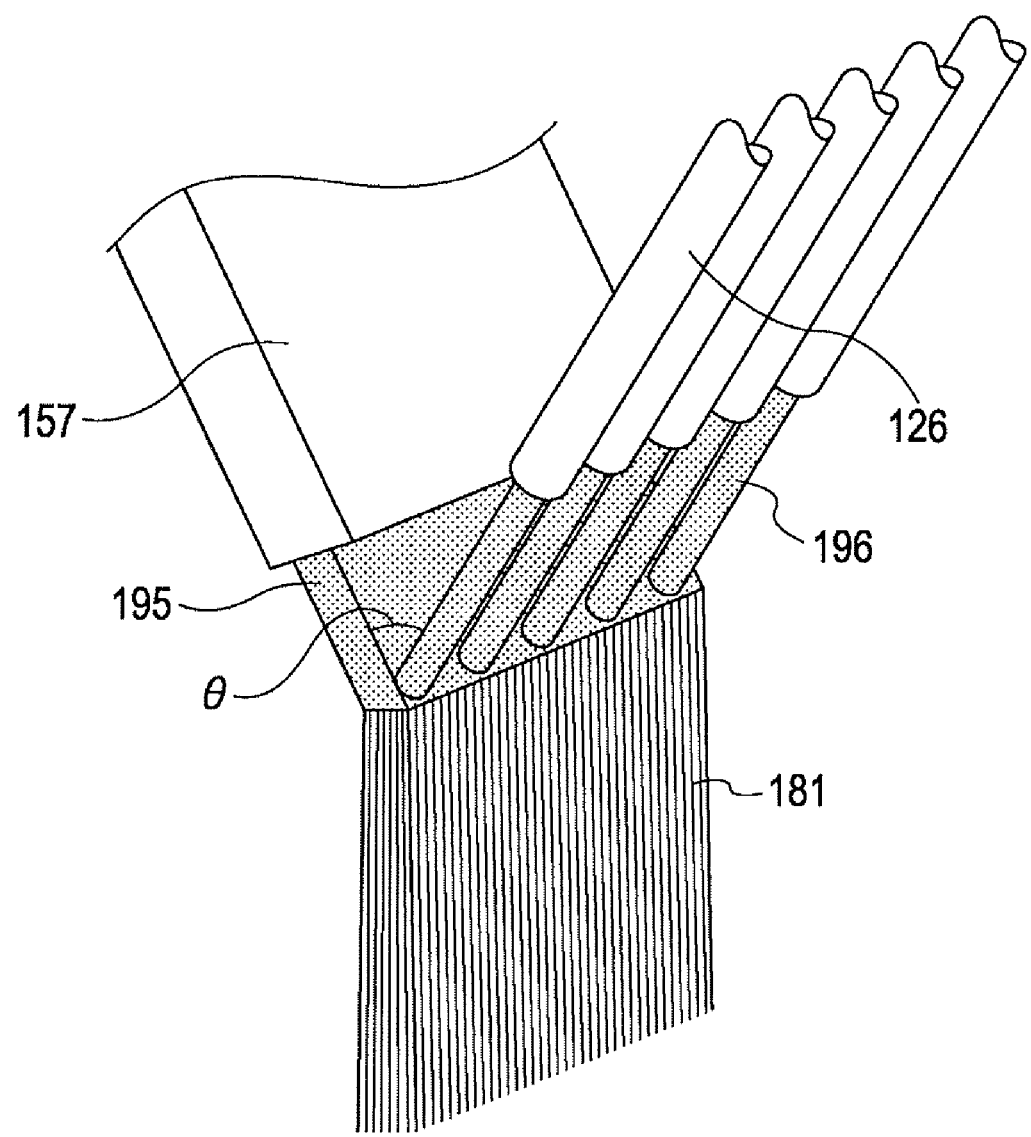
FIG. 8 is a schematic view showing a part of a mixing device which can be applied to a method for manufacturing a dispersion, according to the present invention.
Figure 9:
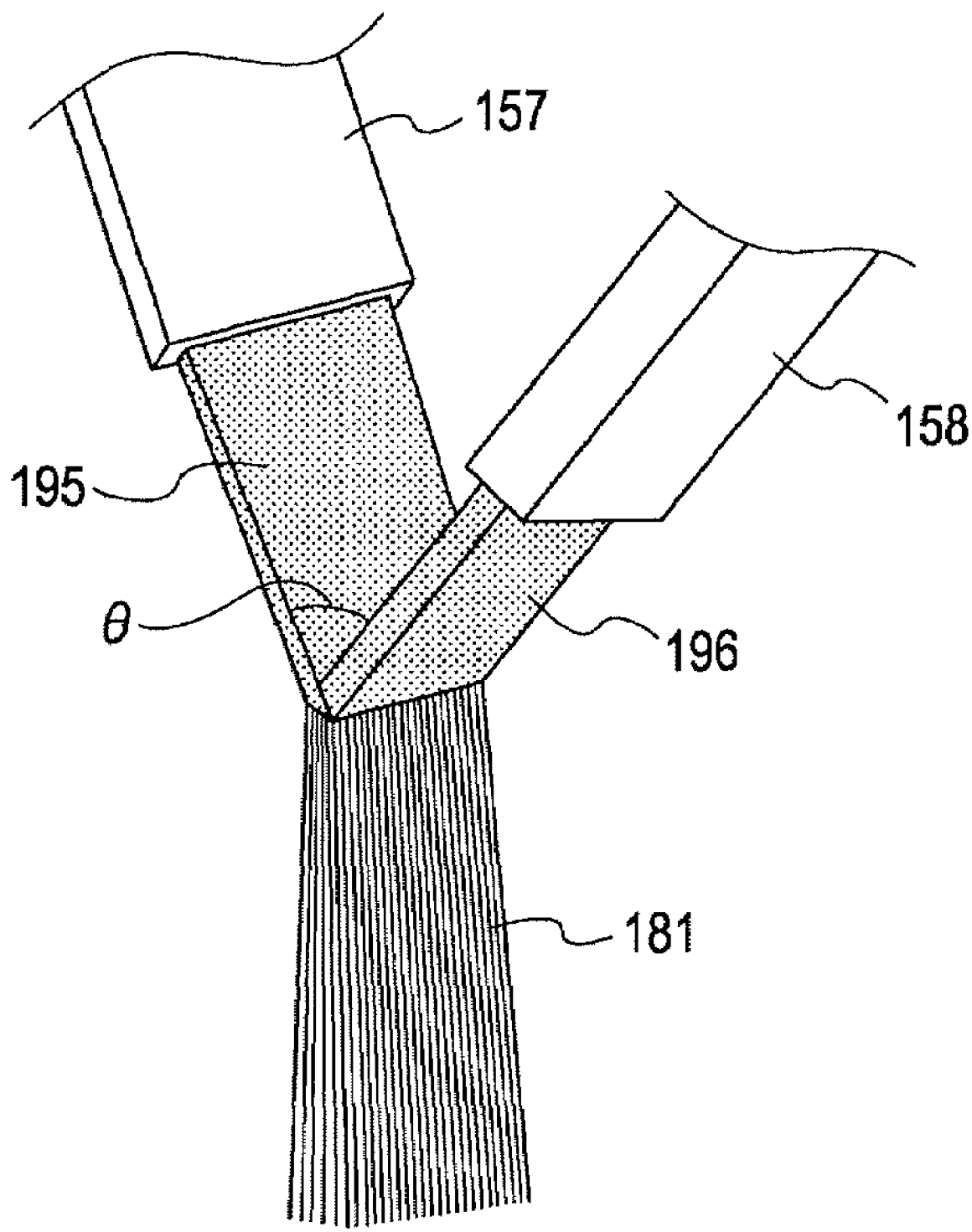
FIG. 9 is a schematic view showing a part of a mixing device which can be applied to a method for manufacturing a dispersion, according to the present invention.

A device shown in FIG. 8 has the structure in which one nozzle 157 is designed to eject the liquid 195 to form a thin sheet shape, and the other nozzle array 126 is similar to that shown in FIG. 6. In addition, a device shown in FIG. 9 has the structure in which nozzles 157 and 158, which form a pair, are designed to eject the liquids 195 and 196, respectively, to form thin sheet shapes.

In the present invention, although a solid substance in the form of particles or the like is formed as the reaction product obtained by reaction between at least two types of liquids, since a mixing place is not covered with a chamber or the like and is an open space, clogging and/or deposition of the product may not occur in the mixing device.

In the liquid mixing device used for the method according to the present invention, the openings of the nozzles are preferably provided in different surfaces. To provide openings in different surfaces means that openings are not provided in the same continuous planar surface. For example, in FIG. 3, the opening 111 of the nozzle 121 and the opening 112 of the nozzle 122 are not formed in the same continuous planer surface. In the mixing device shown in FIG. 3, the liquid 191 ejected from the nozzle 121 and the liquid 192 ejected from the nozzle 122 are different from each other. Accordingly, when the openings 111 and 112 are formed in the same continuous planar surface, the different liquids may be mixed with each other on the opening surface and then may react with each other in some cases. In more particular, when liquids having high wettability for the opening surfaces 221 and 222 are ejected, and when the openings are formed in the same continuous surface, parts of the ejected liquids may wet the surface and spread between the openings to form droplets in some cases, and reaction may occur at a place between the nozzle openings. Accordingly, a reaction product formed between the openings is received as a foreign material in the liquid mixture recovery unit or is mixed with the liquids ejected from the nozzles, and as a result, properties of the reaction product and the functions thereof may be varied thereby in some cases.

Accordingly, in the liquid mixing device used in the present invention, openings of nozzles that eject different liquids are preferably provided in different surfaces instead of providing openings in the same continuous surface. However, the same type of reaction liquids may be ejected from openings provided in the same surface. For example, in the above device shown in FIG. 7, the openings 155 of the nozzle member 321 are provided in the same continuous planar surface 221. In this case, since the liquid 195 ejected from the openings 155 is one type of liquid, even when the liquid flows along the opening surface 221, unnecessary reaction may not occur at all.

The opening of the nozzle may have any shape, such as a circle, an oval, and a polygon including a square or a rectangle. The opening areas of the nozzles may be or may not be equal to each other.

The diameter of the opening of the nozzle or the length of the short side thereof is set to 5,000 μm or less, preferably 1,000 μm or less, more preferably 500 μm or less, and even more preferably 100 μm or less.

As a material used for the nozzle of the liquid mixing device used in the present invention, for example, metal, glass, silicon, Teflon (registered trademark), ceramic, and plastic may be mentioned. In the case in which heat resistance, withstand voltage, and solvent resistance are required, metal, glass, silicon, Teflon, and ceramic may be used, and in particular, metal is preferably used. As the metal, for example, stainless steel, Hastelloy (Ni—Fe-based alloy), nickel, gold, platinum, and tantalum may be mentioned; however, the metal is not limited thereto. After all, a material having corrosion resistance against a liquid to be ejected may be selectively used.

In addition, in order to obtain corrosion resistance of the nozzle and desired surface energy thereof, the nozzle surface may be processed by lining treatment.

In the dispersion manufacturing method according to the present invention, at least two types of liquids are ejected from independently provided respective nozzles. In addition, the ejection amounts of said at least two liquids are determined so that the traveling directions of the ejected liquids intersect each other at an angle of 120° or less and so that said at least two liquids flow in an integrated manner. As a result, a liquid mixture, which just starts mixing, is not scattered, and hence the reaction product can be recovered without any loss thereof. In the case described above, "at least two liquids flow in an integrated manner" indicates the state in which at least 99% of the total of said at least two types of liquids flows together. Conditions to allow the liquid mixture to flow in an integrated manner may be optionally selected in accordance with the viscosities, flow rates and the like of the liquids; however, in the case of a liquid which is used for a general reaction, the ejection flow rate of the liquid may be set to a predetermined flow rate. For example, when a nozzle opening area and an ejection flow rate of a liquid are represented by S (mm$^2$) and L (ml/min), respectively, the ejection flow rate may be set so that L/S is in the range of 26 to 360.

In the present invention, at least two liquids collide with each other at a predetermined speed in a mixing region, inertial forces of the liquids act, and hence mixing and reaction are effectively carried out in a moment.

In the dispersion manufacturing method according to the present invention, when reaction to form fine particles is carried out by collision and mixing between liquids, since a large number of particles are formed based on a large number of nuclei generated by the above reaction which occurs in a moment, fine particles having a small primary diameter are formed. Accordingly, fine particles of a functional material, which have a small primary diameter, can be obtained. In addition, since at least two types of liquids are always brought into contact with each other at the same timing, the reaction proceeds orderly (in good order), and as a result, the particle distribution can be controlled to be narrow. In addition, when a dispersing agent is added to at least one of at least two types of liquids in order to disperse fine particles, which are to be precipitated, in a medium, the fine particles can be dispersed right after the formation thereof. As a result, aggregation of the particles thus formed is suppressed, and a dispersion of a reaction product having a small particle diameter can be obtained. In particular, when the particle diameters and uniformity thereof, of dispersed particles, have considerable influence on the functions of a functional material, the dispersion manufacturing method of the present invention is effectively used.

It is preferable that the liquids ejected from the openings of the nozzles have a thin-rod or a thin-sheet shape and be then brought into contact with each other while having the above shape to start mixing. After the liquids are ejected, when the widths of short sides thereof are increased, and the liquids are then brought into contact with each other, parts thereof are scattered before the contact, and as a result, non-mixed liquid portions are liable to be generated. In addition, after the widths of the short sides of the liquids are increased, when the liquids are brought into contact with each other, since the width of the liquid mixture which starts mixing is also increased, traveling distances and mixing times of individual reaction liquids, which are required for mixing therebetween, in the liquid mixture are both increased. The length of the short side of a cross-sectional view of a liquid just before contact is generally 1 to 20 times that of the short side of an opening of a nozzle, preferably 1 to 10 times, more preferably 1 to 5 times, and even more preferably 1 to 2 times.

At least two types of liquids are designed, in combination, to react with each other right after the start of mixing and to form a dispersion in which a reaction product is dispersed. In this case, all materials contained in the liquids may not always react. That is, among materials relating to the reaction, one material may be excessively present, or a material, such as a solvent, which is not involved in the reaction, may also be present.

The reaction product may be either a solid or a liquid in a dispersion medium. When the reaction product is a liquid, a dispersing agent having a poor solubility for a dispersion medium is adsorbed on or chemical-bonded to liquid molecules of the reaction product, so that a dispersion state is formed. As a reaction which occurs after the start of contact and mixing between at least two types of liquids, for example, a reprecipitation reaction, coupling reaction, and hydrolysis-polycondensation reaction may be mentioned; however, the reaction is not limited thereto. For example, an ion reaction, radical reaction, dehydration reaction, addition reaction, polycondensation reaction, oxidation reaction, reduction reaction, neutralization reaction, and enzyme reaction may also be mentioned by way of example, and those reactions may be carried out in combination.

As the functional material of the present invention, a color material is preferably used. As the color material, as described above, a pigment may be mentioned by way of example. As the pigment, for example, an inorganic achromatic pigment or an organic or inorganic chromatic pigment may be mentioned, and a colorless or a pale color pigment or a metallic glossy pigment may also be used. For the present invention, a newly synthesized pigment may also be used.

For example, in the reprecipitation reaction, a combination may be mentioned by way of example, in which one liquid is a solution dissolving a pigment and the other liquid is a precipitation medium (poor solvent decreasing the solubility of a pigment) for the pigment. In this case, the reaction product is the pigment which is precipitated, and in order to obtain a dispersion in which the pigment is dispersed, a dispersing agent is contained in either one or both of the liquids. In particular, when the pigment, that is the reaction product, has a desired dispersibility for a dispersion medium, a dispersing agent may not be always contained in either one or both of the liquids.

The types of pigments used in the present invention are not particularly limited, and known pigments may be used.

For example, there may be mentioned phthalocyanine-based pigments, such as non-metallic phthalocyanine, copper phthalocyanine, halogenated copper phthalocyanine, and titanyl phthalocyanine; azo-based pigments, such as insoluble azo pigments, condensed azo pigments, azo lake pigments, and chelate azo pigments; quinacridone-based pigments; isoindolinone-based pigments; indanthrone-based pigments; diketo-pyrrolo-pyrrole-based pigments; dioxadine-based pigments; perylene-based pigments; perinone-based pigments; and anthraquinone-based pigments. However, usable pigments are not limited to those mentioned above.

As the above-mentioned pigments, commercially available pigments may be used, and as for black, cyan, magenta, and yellow, for example, the following may be mentioned as commercially available pigments.

As black pigments, for example, there may be mentioned Raven 1060, Raven 1080, Raven 1170, Raven 1200, Raven 1250, Raven 1255, Raven 1500, Raven 2000, Raven 3500, Raven 5250, Raven 5750, Raven 7000, Raven 5000 ULTRA II, and Raven 1190 ULTRA II (those are produced by Columbian Carbon Co.); Black Pearls L, MOGUL-L, Regal 400R, Regal 660R, Regal 330R, Monarch 800, Monarch 880, Monarch 900, Monarch 1000, Monarch 1300, and Monarch 1400 (those are produced by Cabot Co.); Color Black FW1, Color Black FW2, Color Black FW200, Color Black 18, Color Black S160, Color Black S170, Special Black 4, Special Black 4A, Special Black 6, Printex 35, Printex U, Printex 140U, Printex V, and Printex 140V (those are produced by Degussa Co.); No.25, No.33, No.40, No.47, No.52, No.900, No.2300, MCF-88, MA 600, MA 7, MA 8, and Ma 100 (those are produced by Mitsubishi Chemical Co.).

As the cyan pigments, for example, there may be mentioned C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15:4, C.I. Pigment Blue 16, C.I. Pigment Blue 22, and C.I. Pigment Blue 60.

As the magenta pigments, for example, there may be mentioned C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, and C.I. Pigment Red 207.

As the yellow pigments, for example, there may be mentioned C.I. Pigment Yellow 12, C.I. Pigment Yellow 13, C.I. Pigment Yellow 14, C.I. Pigment Yellow 16, C.I. Pigment Yellow 17, C.I. Pigment Yellow 74, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, and C.I. Pigment Yellow 154.

As the solvent dissolving pigments used in the present invention, the following solvents may be mentioned by way of example.

As organic solvents, any solvent may be used as long as it dissolves organic pigments under the presence of alkali; however, a solvent having a water solubility of 5% or more is preferably used, and further, a solvent which is freely mixed with water is more preferably used. When a pigment is solubilized by using a solvent having a water solubility of less than 5%, an organic pigment is not likely to be precipitated when the solvent is mixed with water, and large and coarse particles are liable to be formed, which is disadvantageous. In addition, since the afore-mentioned solvent tends to have adverse influence on dispersion stability of a pigment dispersion to be obtained, it is also not advantageous.

As the organic solvents, for example, there may be mentioned dimethylsulfoxide, dimethylimidazolidinone, sulfolane, N-methylpyrrolidone, dimethylformamide, acetonitrile, acetone, dioxane, tetramethylurea, hexamethylphosphoamide, hexamethylphosphotriamide, pyridine, proplonitrile, butanone, cyclohexanone, tetrahydrofurane, tetrahydropyrane, ethylene glycol diacetate, and γ-butyrolactone. Among those mentioned above, dimethylsulfoxide, N-methylpyrrolidone, dimethylformamide, dimethylimidazolidinone, sulfolane, acetone, and acetonitrile are preferably used. In addition, those mentioned above may be used alone or in combination.

As the acid, any acid may be used as long as it solubilizes an organic pigment by itself or in combination with an organic solvent, and an organic protonic acid or an inorganic protonic acid may be used.

As the organic protonic acid, for example, there may be mentioned alkylsulfonic acids, such as methanesulfonic acid, ethanesulfonic acid, propanesulfonic acid, and butanesulfonic acid; halogenated alkylsulfonic acids obtained by halogenating the above compounds, such as trifluoromethanesulfonic acid, pentafluoroethanesulfonic acid, heptafluoropropanesulfonic acid, nonafluorobutanesulfonic acid, and trimethylsilyl trifluoromethanesulfonate; alkyl carboxylic acids, such as formic acid, acetic acid, propionic acid, and butanoic acid; halogenated alkylcarboxylic acids obtained by halogenating the above compounds, such as trifluoroacetic acid, trichloroacetic acid, chlorocaproic acid, bromocaproic acid, and chloroundecanoic acid; aromatic carboxylic acids, such as benzoic acid and tetrafluorobenzoic acid; and aromatic sulfonic acids, such as benzenesulfonic acid, toluenesulfonic acid, xylenesulfonic acid, naphthalenesulfonic acid, and chlorobenzenesulfonic acid.

As the inorganic acid, sulfuric acid, nitric acid, phosphoric acid, polyphosphoric acid, hydrochloric acid, perchloric acid, hydrobromic acid, hydroiodic acid, and chlorosulfonic acid may be mentioned by way of example.

In addition, the acids mentioned above may be used alone or in combination.

When an acid or an alkali is used together with an organic solvent, in order to obtain an ideal solution, a solvent, such as water, a lower alcohol, or glycerin, having a high solubility for acid or alkali may be added to the organic solvent. As a result, even when an organic solvent having a low solubility for acid or alkali is used, an organic pigment can be easily dissolved.

As the precipitation medium (poor solvent decreasing the solubility of a pigment), for example, the following compounds may be mentioned.

That is, for example, there may be mentioned polyhydric alcohols, such as ethylene glycol, diethylene glycol, triethylene glycol, poly(ethylene glycol), propylene glycol, poly(propylene glycol), and glycerin; monohydric alcohols, such as methanol, ethanol, and isopropyl alcohol; polyhydric alcohol ethers, such as ethylene glycol monomethyl ether, ethylene glycol monoethyl ether, ethylene glycol monobutyl ether, diethylene glycol monoethyl ether, and diethylene glycol monobutyl ether; N-containing solvents, such as N-methyl-2-pyrrolidone, substituted pyrrolidone, and triethanol amine; esters, such as butyl acetate and cellosolve acetate; ketones, such as methyl ethyl ketone, cyclohexanone, and methyl isobutyl ketone; and hydrocarbons, such as cyclohexane, heptane, octane, and isooctane. Water can be used in all the pH range; however, the pH is preferably in the range of 1 to 14. In addition, the precipitation media mentioned above may be used alone or in combination.

In addition, in order to increase the precipitation reaction rate and the dispersion stability of a pigment dispersion to be formed, an acid or an alkali may be added to the above precipitation medium.

In the case of the coupling reaction, for example, there may be mentioned a combination in which one liquid is a coupler solution, and the other liquid is a diazonium salt solution. In this case, the reaction product is an azo compound, and in order to obtain a dispersion of the azo compound, a dispersing agent is contained in either one or both of the two types of solutions. However, when the azo compound, the reaction product, has a desired dispersibility for a dispersion medium, a dispersing agent is not always necessarily contained.

As the azo compound, for example, there may be mentioned azo-based pigments, such as azo, bisazo, insoluble azo, condensed azo, azo lake, and chelate azo pigments. As the pigment, commercially available pigment may also be used. The commercially available pigments are shown below by way of example.

That is, for example, there may be mentioned C.I. Pigment Yellow 74, 93, 94, 95, 120, 128, 151, 154, 166, 175, 180, and 181; C.I. Pigment Red 5, 31, 144, 146, 147, 150, 166, 176, 184, and 269; and Pigment Orange 31.

As the diazonium salt, for example, diazonium salts derived from compounds having an aromatic amine and a heterocyclic amine structure may be used.

As the coupler, for example, there may be used a coupler containing an aromatic compound having an aniline, a phenol, or a naphthol structure, or a compound having an acetoacetoxy group; however, the coupler is not limited thereto.

As the hydrolysis-polycondensation reaction, a combination in which one liquid is an inorganic alkoxide and the other liquid is a solution containing water may be mentioned by way of example. In this case, the reaction product is an inorganic-alkoxide hydrolysis polycondensate. A hydrolysis reaction of an inorganic alkoxide and a polycondensation reaction performed thereafter are collectively called a sol-gel method. In the sol-gel method, after an inorganic alkoxide is processed in a solution by hydrolysis-condensation reaction to form a sol which contains fine particles of an inorganic oxide or inorganic hydroxide, the reaction is allowed to further proceed to form a gel. In order to obtain a dispersion of an inorganic-alkoxide hydrolysis polycondensate, a dispersing agent is contained in either one or both of reaction liquids A and B. However, when the inorganic-alkoxide hydrolysis polycondensate, that is, a reaction product C, has a desired dispersibility for a dispersion medium, a dispersing agent is not always necessarily contained in either one or both of the reaction liquids A and B.

As the inorganic alkoxide, for example, a compound represented by the following formula (I) may be mentioned.

$$R^1_n M(OR^2)_{m-n} \tag{I}$$

In the above formula (I), M is an atom selected from the group consisting of Si, Al, Ti, Zr, Ca, Fe, V, Sn, Li, and Be; $R^2$ is an alkyl group; $R^1$ is an alkyl group or an alkyl group having a functional group; m is an atomic valence of M; and n is an integer from 1 to m.

Among the compounds represented by the formula (I), a compound in which n=0 holds, that is, a compound formed of M and an alkoxy group bonded thereto, is frequently used.

When M is Ti, the atomic valence m of Ti is 4, and this type of alkoxide is represented by $Ti(OR^2)_4$. As the titanium alkoxide mentioned above, for example, there may be mentioned $Ti(OCH_3)_4$, $Ti(OC_2H_5)_4$, $Ti(OC_3H_7)_4$, $Ti(OCH(CH_3)_2)_4$, and $Ti(OC_4H_9)_4$.

When M is Si, the atomic valence m of Si is 4, and this type of alkoxide is represented by $Si(OR^2)_4$. As the alkoxysilane mentioned above, for example, there may be mentioned

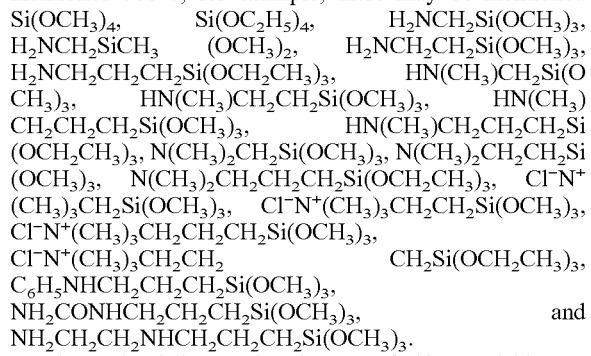

When M is Al, the atomic valence m of Al is 3, and this type of alkoxide is represented by $Al(OR^2)_3$. As the aluminum alkoxide mentioned above, for example, there may be mentioned $Al(OCH_3)_3$, $Al(OC_2H_5)_3$, $Al(OC_3H_7)_3$, $Al(OCH(CH_3)_2)_3$, and $Al(OC_4H_9)_3$.

As other inorganic alkoxides, for example, there may be mentioned $Ca(OC_2H_5)_2$, $Fe(OC_2H_5)_3$, $V(OCH(CH_3)_2)_4$, $Sn(OC(CH_3)_3)_4$, $Li(OC_2H_5)$, and $Be(OC_3H_7)_2$.

In addition, an inorganic halide containing halogen instead of alkoxy $OR^2$ may also be used.

The dispersion manufacturing method of the present invention is not limited to the above reactions and may also be applied to a method for manufacturing a dispersion of metal nanoparticles.

As the dispersing agent, a compound which is dissolved in at least one of at least two types of liquids to be mixed together is used. The dispersing agent may be soluble or insoluble in a dispersion medium for a reaction product. As the dispersing agent, a surfactant or a resin having both hydrophilic and hydrophobic portions may be used. As the resin having both hydrophilic and hydrophobic portions, for example, a copolymer of a hydrophilic monomer and a hydrophobic monomer may be mentioned.

As the hydrophilic monomers, acrylic acid, methacrylic acid, maleic acid, fumaric acid, monoesters of the aforementioned carboxylic acids, vinylsulfonic acid, styrenesulfonic acid, vinyl alcohol, acrylamide, and methacryloxyethyl phosphate may be mentioned by way of example. As the hydrophobic monomer, for example, styrene derivatives such as styrene and α-methylstyrene, vinylcyclohexane, vinylnaphthalene derivatives, acrylic esters, and methacrylic esters may be mentioned. As the copolymer, for example, various types of copolymers including a random, a block, and a graft copolymer may be mentioned. Of course, the hydrophilic monomers and the hydrophobic monomers are not limited to those mentioned above.

As the surfactant, for example, there may be used anionic surfactants, nonionic surfactants, cationic surfactants, and amphoteric surfactants.

As the anionic surfactant, for example, there may be mentioned fatty acid salts, alkylsulfate salts, alkylarylsulfonate salts, alkyldiaryl ether disulfonate salts, dialkyl sulfosuccinate salts, alkylphosphate salts, naphthalenesulfonic acid-formaldehyde condensates, polyoxyethylenealkyl phosphate salts, and glycerol borate fatty acid esters.

As the nonionic surfactant, for example, there may be mentioned polyoxyethylene alkyl ether, polyoxyethylene-oxypropylene block copolymer, sorbitan fatty acid ester, glycerin fatty acid ester, polyoxyethylene fatty acid ester, polyoxyethylenealkylamine, fluorine-based surfactants, and silicone-based surfactants.

As the cationic surfactant, for example, there may be mentioned alkylamine salts, quaternary ammonium salts, alkylpyridinium salts, and alkylimidazolium salts.

As the amphoteric surfactant, for example, there may be mentioned alkylbetaine, alkylamine oxide, and phosphatidylcholine.

However, the surfactants are not also limited to those mentioned above.

Next, the dispersion according to the second aspect of the present invention will be described in detail.

When a reaction product obtained by the above reaction using the pigment and the precipitation medium (poor solvent decreasing the solubility of a dissolved pigment), which are described in the above dispersion manufacturing method, is used, a pigment dispersion in which pigment particles are dispersed in a dispersion medium is obtained.

The dispersion of the present invention may use a reaction product as obtained from the above reaction. Alternatively, by performing filtration, dialysis, ultrafiltration, or the like for a liquid containing the reaction product obtained by the reaction, the concentration of the pigment dispersion and/or those of other components may be adjusted in accordance with purposes and usage. Furthermore, a plurality of types of pigment-dispersion particles may be mixed together at a predetermined ratio so as to obtain a specific color, particle distribution, and the like, which cannot be obtained from one type of pigment. In addition, in accordance with purposes and usage, a new additive may also be used.

The additive is not particularly limited, and for example, when a printing medium is made of a fibrous material, such as paper, or has an ink-absorbing layer on the surface, a penetrating agent, which controls, for example, a penetrating rate of ink into a printing medium, may be used whenever necessary. When a printing unit is a nozzle or a slit, a nonionic surfactant may be used as an additive to improve the wettability of a wall of the nozzle or the like. When an ink-jet printer has a drive method in which ink is heated and foamed by a heater in a nozzle and is then discharged therefrom, an additive imparting heat resistance to the ink may be used. In addition, besides the additives described above, in order to maintain and improve the ink properties, various additives, such as a wetting agent including glycol, glycol ether, amide, or pyrrolidone, binding agent, oxygen absorber, property adjuster, electric charge adjuster, antimold agent, and chelating agent, may also be used. An optimum additive may be selected in accordance with the following usage, or any additives may not be used at all.

The way of using a pigment ink using the dispersion of the present invention is not particularly limited.

A coating ink may be mentioned by way of example which is applied to a surface of a printing medium, such as paper, having a uniform surface to color a part or an entire thereof. As an application method, for example, a method may be mentioned which performs coating by jetting a pigment ink through a nozzle or a slit to a printing medium. As a unit that performs coating on a printing medium by jetting ink through a nozzle, an ink-jet printer may be mentioned by way of example.

As other application methods, for example, a method may be mentioned in which a printing tool with a pigment ink adhering thereto is brought into contact with a printing medium for coating. In particular, in the method described above, a printing tool, such as a brush or a fibrous pen tip, which can retain a liquid, is once impregnated with a pigment ink and is then brought into contact with a printing medium. Besides the above method, the following methods may also be mentioned by way of example.

That is, for example, there may be mentioned a method in which a rotatable ball fitted in a nozzle front is brought into contact with a printing medium and is rotated thereon so as to apply a pigment ink which adheres on a ball surface to the printing medium, and a method in which a pigment ink is transferred onto a printing medium using a printing tool such as a relief, engraved, or mimeograph printer.

In addition, the pigment ink may be used as a colorant used in a manufacturing method in which the colorant is suspended in a transparent material having fluidity, followed by curing the material to form a colorant material. Furthermore, since the dispersing agent has superior stability, the pigment ink itself may also be used as a liquid or fluid colorant.

EXAMPLES

Hereinafter, the present invention will be described in detail with reference to the examples; however, the present invention is not limited to the following examples.

Example 1

Figure 10:
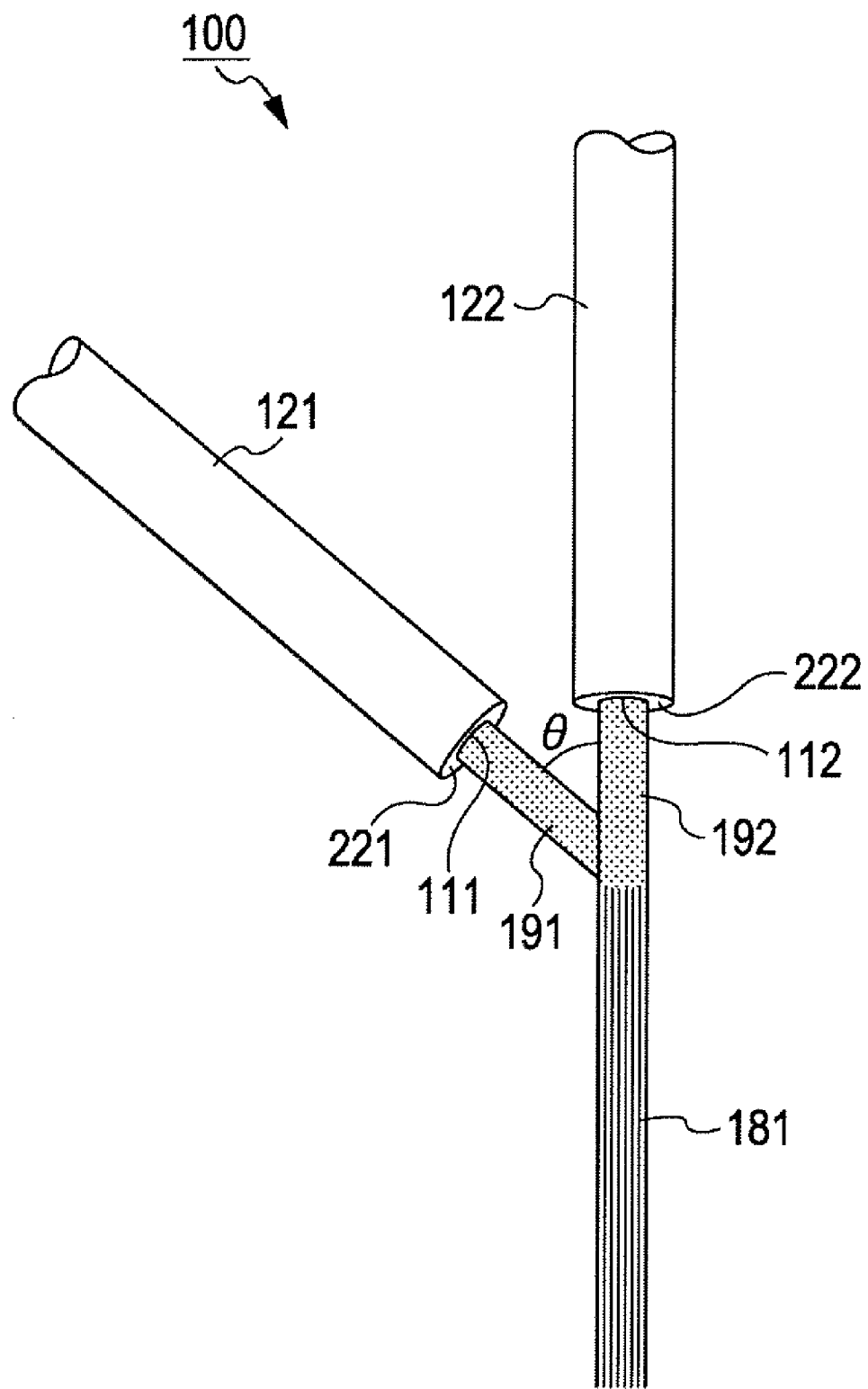
FIG. 10 is a schematic view showing a part of a mixing device which can be applied to a method for manufacturing a dispersion, according to the present invention.

In this example, the liquid mixing device 100 shown in FIG. 10 was used. The nozzle 121 ejecting one type of liquid was made of Teflon (registered trademark) and had an opening diameter of 300 µm. The nozzle 122 ejecting the other type of liquid was made of glass and had an opening diameter of 470 µm. In addition, an angle made of the traveling directions of the above two liquids was set to 40°.

The liquid to be ejected from the nozzle 121 was prepared as described below. Dimethyl sulfoxide in an amount of 100 parts by weight was added to 10 parts by weight of a quinacridone pigment, C.I. Pigment Red 122, to form a suspension. Subsequently, as a dispersing agent, 40 parts by weight of sodium lauryl sulfate was added, and until the above materials were dissolved together, an aqueous solution containing potassium hydroxide at a concentration of 25% was being added to prepare a reaction liquid. As the liquid to be ejected from the nozzle 122, ion exchange water was used.

As the liquid supply units, syringe pumps were used, and the two types of liquids were supplied to the nozzles 121 and 122. The liquid ejected from the nozzle 121 was supplied by the syringe pump at a flow rate of 7 ml/min, and the liquid ejected from the nozzle 122 was supplied by the syringe pump at a flow rate of 10 ml/min.

The two types of liquids ejected from the nozzles came to contact with each other on the extensions of the respective traveling directions, and the reprecipitation reaction and dispersing occurred in a moment, thereby forming a dispersion of the quinacridone pigment. The diameters of particles of this dispersion were very uniform, and the average particle diameter was 30 nm.

Example 2

In this example, the liquid mixing device shown in FIG. 4 was used. The nozzle 122 ejecting one type of liquid was made of Teflon (registered trademark) and had an opening diameter of 200 µm. The nozzle 121 ejecting the other type of liquid was made of glass and had an opening diameter of 310 µm. In addition, an angle made of the traveling directions of the above two liquids was set to 90°.

The liquid to be ejected from the nozzle 122 was prepared as described below. Dimethyl sulfoxide in an amount of 50 parts by weight was added to 10 parts by weight of a disazo pigment, C.I. Pigment Yellow 128, to form a suspension. Subsequently, as a dispersing agent, 40 parts by weight of polyoxyethylene lauryl ether was added, and until the above materials were dissolved together, an aqueous solution containing potassium hydroxide at a concentration of 25% was being added to prepare a reaction liquid. As the liquid to be ejected from the nozzle 121, ion exchange water was used.

As the liquid supply units, plunger pumps were used, and the two types of liquids were supplied to the nozzles 122 and 121. The liquid ejected from the nozzle 122 was supplied by the plunger pump at a flow rate of 7 ml/min, and the liquid ejected from the nozzle 121 was supplied by the plunger pump at a flow rate of 10 ml/min.

The two types of liquids 191 and 192 came to contact with each other on the extensions of the respective traveling directions, and the reprecipitation reaction and dispersing occurred in a moment, thereby forming a dispersion of the disazo pigment. The diameters of particles of this dispersion were very uniform, and the average particle diameter was 25 nm.

Example 3

In this example, a liquid mixing device similar to that in Example 1 was used. When Pigment Yellow 83 particles were synthesized from an aqueous 3,3'-dichlorobenzidene tetraazo solution flowing through the nozzle 121 and an aqueous coupler solution at a concentration of approximately 5% flowing through the nozzle 122, particles having a small and uniform diameter could be obtained as was the case of Example 1.

The nozzle 121 was made of Teflon (registered trademark) and had an opening diameter of 300 µm, and the nozzle 122 was made of glass and had an opening diameter of 470 µm. In addition, an angle made of the traveling directions of both the liquids 191 and 192 was set to 60°.

The liquid to be ejected from the nozzle 121 was an aqueous 3,3'-dichlorobenzidene tetraazo solution, and the liquid to be ejected from the nozzle 122 was a solution formed by dissolving polyoxyethylene lauryl ether in an aqueous coupler solution at a concentration of approximately 5%.

The two types of liquids came to contact with each other on the extensions of the respective traveling directions, and the reprecipitation reaction and dispersing occurred in a moment, thereby forming a dispersion of C.I. Pigment Yellow 83. The diameters of particles of the dispersion thus obtained were very uniform, and the average particle diameter was 30 nm.

Example 4

In this example, the liquid mixing device provided with three nozzles, shown in FIG. 5, was used.

In this example, the nozzle 121 was made of glass, a hydrophobic surface of which was processed by surface modification, and had an opening diameter of 300 µm, and the nozzle 122 was made of glass, a hydrophobic surface of which was processed by surface modification, and had an opening diameter of 470 µm. The nozzle 123 was made of Teflon (registered trademark) and had an opening diameter of 470 µm. An angle formed by the traveling directions of the liquid 191 ejected from the nozzle 121 and the liquid 192 ejected from the nozzle 122 was set to 90°. In addition, an angle formed by the traveling directions of the liquid 191 and the liquid 193 ejected from the nozzle 123 and was set to 60°, and an angle formed by the traveling directions of the liquid 192 and the liquid 193 was set to 60°.

The liquid 191 was a solution containing 25 parts by weight of tetrahydrofurane and 7 parts by weight of a fat-soluble dye, Oil Yellow (manufactured by Orient Chemical Ltd.), dissolved therein. In the liquid 192, as a dispersing agent, a block copolymer was used. In this copolymer, 2-(4-methylphenyl) ethyl vinyl ether was used as an A segment, 2-(2-methoxyethyloxy)ethyl vinyl ether was used as a B segment, and 4-(2-vinyloxy)ethoxy ethyl benzoate was used as a C segment. The copolymerization ratio A/B/C was set to 90, 80, and 14, and a C block of the triblock copolymer was designed to derive deprotection of ethyl benzoate. A solution containing 10 parts by weight of this triblock copolymer and 25 parts by weight of tetrahydrofurane was prepared as the liquid 192. As the liquid 193, an aqueous potassium hydroxide solution at a concentration of 0.1 mol/l was used. As the liquid supply units, plunger pumps were used to supply the liquids 191, 192, and 193 to the respective nozzles. The liquid 191, the liquid 192, and the liquid 193 were supplied by the respective plunger pumps at flow rates of 6, 7, and 14 ml/min, respectively.

The liquid 191, the liquid 192, and the liquid 193 came to contact with each other on the extensions of the respective traveling directions, the benzoic acid of the C block was neutralized by potassium hydroxide, the fatty-soluble dye, Orange Yellow, was enclosed with the triblock copolymer at a moment, and as a result, a large number of uniform and small micelles were formed. The average particle diameter was 60 nm.

Example 5

In this example, a mixing device similar to that in Example 1 was used.

In this example, except that the liquid 191 to be ejected from the nozzle 121 was titanium tetraisopropoxide and that the liquid 192 to be ejected from the nozzle 122 was an aqueous isopropyl alcohol at a concentration of approximately 60%, the mixing of the liquids was performed in a manner similar to that in Example 1. As a hydrolysis polycondensate, a dispersion containing only titania was obtained, and the particle diameters thereof were very uniform, having an average particle diameter of 30 nm.

Comparative Example 1

A reaction was performed in a manner similar to that in Example 1 except that the angle formed by the traveling directions of the liquids 191 and 192 was set to 180°. As a result, the liquids were scattered in all directions after contact therebetween, and hence the dispersion could not be easily recovered. Furthermore, it was confirmed that when the scattered dispersion falls, it is mixed in the reaction liquid ejected from the opening of the nozzle. Hence, in the dispersion thus obtained, particles having a large diameter were present, and the uniformity of the particle diameters was not good.

Comparative Example 2

A reaction was performed in a manner similar to that in Example 1 except that the angle formed by the traveling directions of the liquids 191 and 192 was set to 130°. In this comparative example, the liquids were also scattered, and hence the dispersion could not be easily recovered. Furthermore, it was confirmed that when the scattered dispersion falls, it is mixed in the reaction liquid ejected from the opening of the nozzle. In the dispersion thus obtained, particles having a large diameter were present, and hence the uniformity of the particle diameters was not good.

Example 6

An ink was manufactured using an aqueous solution containing the dispersion obtained in Example 1, which is formed of quinacridone pigment particles, C.I. Pigment Red 122, having a uniform diameter and an average diameter of 30 nm. In particular, the aqueous solution containing the dispersion was processed by ultrafiltration to remove water together with excessive sodium lauryl sulfate dissolved in the liquid, so that the pigment particle concentration was increased. Next, isopropyl alcohol and ethylene glycol were added to the dispersion thus obtained, thereby forming a pigment ink for ink-jet printer.

After this pigment ink was filled in a transparent glass bottle and air-tightly sealed, the glass bottle was placed in a stationary manner at room temperature for several weeks in an experimental laboratory in which fluorescent lamps were turned on; however, precipitation was not observed at all. In addition, although an absorption spectrum of the ink was measured by an absorptiometer (UV3100: manufactured by Shimadzu Corp.), the spectrum was not substantially changed before and after the ink was placed as described above, and hence it was understood that the pigment particles maintains its dispersibility and that the above pigment ink has stability as an ink.

Figure 11:
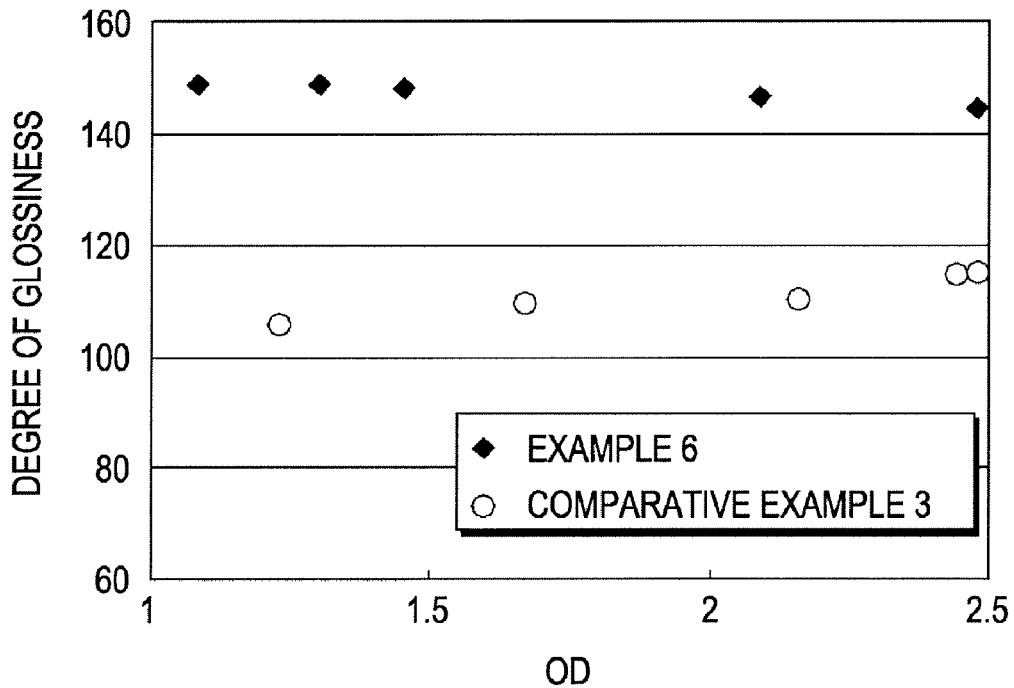
FIG. 11 is a graph showing 20° of gloss of a square pattern printed using a pigment ink of the present invention and that of square pattern printed using a general pulverized pigment ink.
Figure 12:
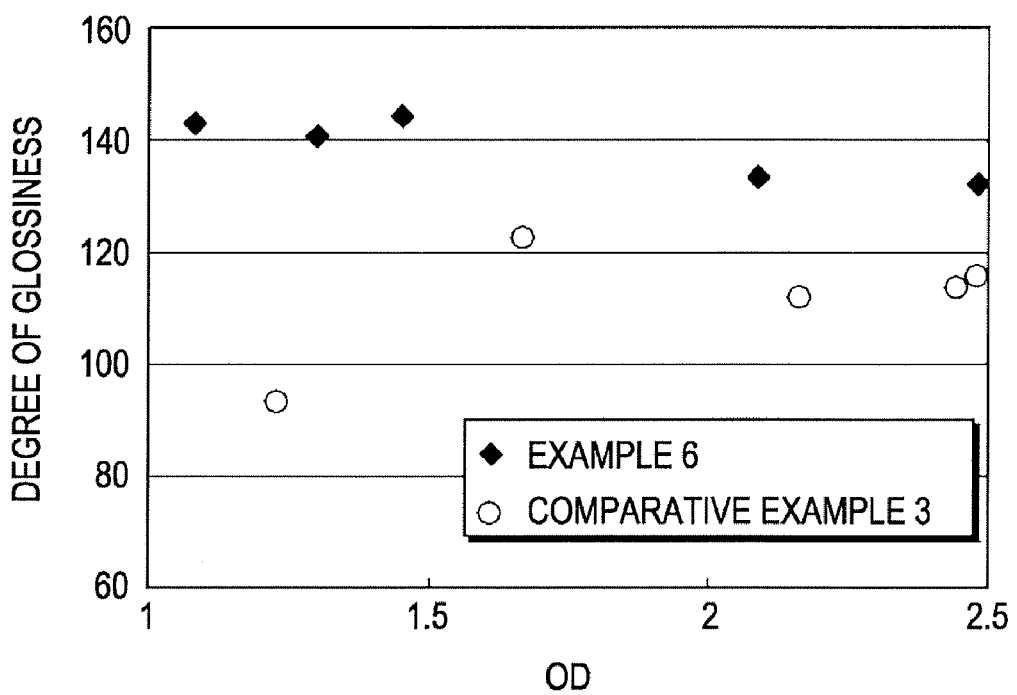
FIG. 12 is a graph showing 60° of gloss of a square pattern printed using a pigment ink of the present invention and that of a square pattern printed using a general pulverized pigment ink.

The ink described above was optionally diluted, so that five types of inks were formed which had different concentrations of the quinacridone pigment particles. After each ink was filled in an ink cartridge for ink-jet printer manufactured by Canon Kabushiki Kaisha, the cartridge was placed in an ink-jet printer (PIXUS950: manufactured by Canon Kabushiki Kaisha), and a square pattern was then printed on photographic grade ink-jet paper (PR-101: manufactured by Canon Kabushiki Kaisha). After the ink was dried, 20° of gloss and 60° of gloss were measured by a glossmeter (GMX-203: manufactured by Murakami Color Technology Research Laboratory, Co., Ltd.) in accordance with JIS Z8741, and a reflection optical density (OD) was measured by an OD meter (Gretag Macbeth RD-19: manufactured by Sakata Inx Corp). The results are shown in FIGS. 11 and 12. As a result, it was found that as long as the OD is in the range of 1 to 2.5, the 20° of gloss is approximately 150, and the 60° of gloss is approximately 130 to 140.

In addition, the surface of a square pattern printed using ink having an OD of 2.48 was observed by AFM (NanoScope IIIa; manufactured by Veeco), and the surface roughness in a square having a 2-μm side was calculated. The average obtained from 3 measurement points was 5.18 nm. In the same manner as described above, the surface roughness of photographic grade ink-jet paper itself was also measured and calculated, and an average value of 10.4 nm was obtained. Hence, it was confirmed that when the pigment ink formed in this example was used for printing, the surface roughness was improved by approximately 5 nm.

Comparative Example 3

A dispersion was formed from pulverized quinacridone pigment particles of C.I. Pigment Red 122 having an average particle diameter of 100 nm by using lauryl sodium sulfate as a dispersing agent and water as a dispersion medium. In addition, isopropyl alcohol and ethylene glycol were added, so that a pigment ink for ink-jet printer, having a concentration similar to that in Example 6, was formed.

In a manner similar to that in Example 6, a square pattern was printed using this pigment ink on photographic grade ink-jet paper by an ink-jet printer, and the glossiness and the OD were measured. The results are shown in FIGS. 11 and 12. It was found that the 20° of gloss is approximately 110 when the OD is in the range of 1 to 2.5, and the 60° of gloss is 93 at an OD of 1.2 and is approximately 120 at an OD of more than 1.2.

In addition, by calculation of the surface roughness of a square pattern printed using an ink having an OD of 2.48 in a manner similar to that in Example 6, a surface roughness of 14.1 nm was obtained, and hence it was found that the surface roughness of the above square pattern is inferior to that obtained in Example 6 and, furthermore, is inferior to that of the surface of the photographic grade ink-jet paper itself.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-370097 filed Dec. 22, 2005, which is hereby incorporated by reference herein in its entirety.

What is claimed is:

1. A method for manufacturing a dispersion, including a dispersion medium and particles dispersed therein, which particles are formed from a reaction product by allowing at least two types of liquids to react with each other, said method comprising the following steps:

preparing at least two nozzles, the openings of which have a diameter of 500 μm or less; and ejecting at least two types of liquids from the independently provided respective nozzles so that traveling directions of the liquids intersect with each other at an angle of 120° or less and so that the liquids then flow in an integrated manner to come into contact with each other to give rise to the reaction product, wherein one of the ejected liquids is a solution containing a pigment, and another of the ejected liquids is a solvent decreasing the solubility of the pigment, and at least one of the liquids contains a dispersing agent, and wherein the flow rates of the ejected liquids are each set so that L/S is in the range of 26 to 360, in which a nozzle opening area and a flow rate of an ejected liquid are represented by S ($mm^2$) and L (ml/min), respectively.

2. The method for manufacturing a dispersion, according to claim 1, wherein the reaction is a coupling reaction.

3. The method for manufacturing a dispersion, according to claim 2, wherein one of the ejected liquids is a solution containing a coupler and a dispersing agent, and another of the ejected liquids contains a diazinium salt.

4. The method for manufacturing a dispersion, according to claim 1, wherein the reaction is a hydrolysis-polycondensation reaction.

5. The method for manufacturing a dispersion, according to claim 4, wherein one of the ejected liquids is a solution containing an inorganic alkoxide compound, and another of the ejected liquids is an aqueous solvent.

* * * * *